Feb. 5, 1963 D. T. AYERS, JR 3,076,441
FLUID PRESSURE MOTOR MECHANISM
Filed Nov. 9, 1961
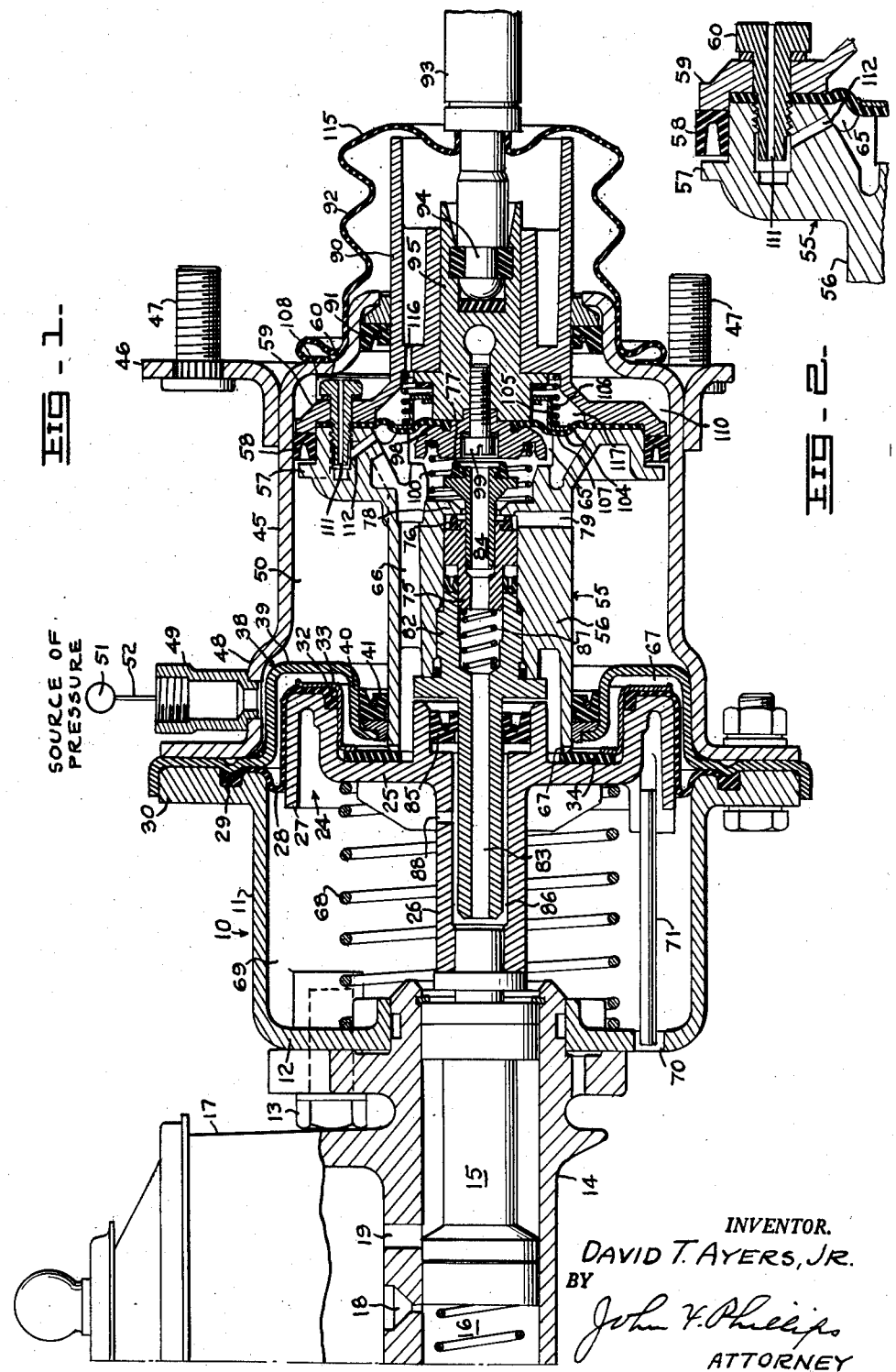
INVENTOR.
DAVID T. AYERS, JR.
BY
John V. Phillips
ATTORNEY

3,076,441
FLUID PRESSURE MOTOR MECHANISM
David T. Ayers, Jr., Birmingham, Mich., assignor to Kelsey-Hayes Company, Romulus, Mich., a corporation of Delaware
Filed Nov. 9, 1961, Ser. No. 151,361
14 Claims. (Cl. 121—38)

This invention relates to a fluid pressure motor mechanism and is an improvement over the mechanism shown in my copending application Serial No. 137,397, filed September 11, 1961, and over the structure shown in the copending application of William Stelzer, Serial No. 148,516, filed October 30, 1961.

In my copending application referred to above, I have disclosed a fluid pressure motor mechanism especially adapted for operating the hydraulic brake systems of motor vehicles. It is conventional in such systems to use a booster motor mechanism wherein a master cylinder plunger is operated partly by motor power and partly by pedal force for generating hydraulic braking pressures for transmission to the vehicle wheel cylinders. My copending application referred to discloses a novel type of mechanism wherein, under normal conditions, the fluid pressure motor performs all of the work in applying the brakes. It is necessary to move the brake pedal only a very short distance solely to operate the valve mechanism for energizing the fluid pressure motor. Thus it is unnecessary for the operator to move the pedal the usual distance for performing a braking operation, and, under normal conditions, the resistance felt by the operator in applying the brakes is solely the reaction forces transmitted to the brake pedal in proportion to the degree of energization of the motor.

The mechanism referred to is so constructed that upon a failure in the source of power for operating the brakes, the operator may push the pedal a further distance to transmit direct pedal forces to the master cylinder plunger to operate the brakes. It is possible with such mechanism to transmit such pedal forces when it is unnecessary or undesirable to do so. In the copending application of William Stelzer, referred to above, the axially movable structure which carries the valve mechanism and through which pedal forces are transmitted to the motor piston and thus to the master cylinder plunger is retained in its normal position by differential pressure, there being a pressure chamber connected to the source of pressure for holding such structure against movement unless the source of power fails. With such prior mechanism, assuming that there is a partial failure of pressure in the source, it is possible to transmit direct pedal forces to the motor to assist the pressure therein, but it is necessary for the operator to exert part of the pedal forces to overcome the pressure tending to hold in normal position the axially movable structure referred to.

An important object of the present invention is to provide a novel motor mechanism of the character referred to wherein, under normal conditions, the fluid pressure motor provides all of the braking forces, and to provide means whereby pedal forces may be directly transmitted through the motor piston to the master cylinder plunger when the motor reaches a point of "power run-out," that is, when a motor has been energized to its maximum extent, regardless of whether the normal source pressure is available or there has been a drop in such pressure.

A further object is to provide such a mechanism wherein source pressure is utilized to tend to prevent movement of the axially movable structure referred to, but wherein pressures delivered to the motor to operate it are utilized for tending to balance pressures affecting the axially movable unit so that when the point of power run-out is reached, the only resistance to the movement of the pedal will be that occurring through the reaction means, such resistance being proportional to the degree of brake energization and the source pressure otherwise being ineffective for resisting pedal movement so that when pedal operation of the brakes becomes necessary, substantially all of the forces delivered to the pedal by the operator's foot will be transmitted to the master cylinder plunger.

A further object is to provide such a mechanism wherein the axially movable member has one side constantly open to source pressure and its other side subject to pressure as controlled by the valve mechanism so that such other side of the axially movable member is subjected to progressively increasing pressures as the motor is progressively energized, the pressures affecting the axially movable structure and the valve mechanism being substantially balanced at the point of power run-out so that the operator, to transmit pedal forces to the master cylinder, is forced to overcome only the normal reaction transmitted to the brake pedal in accordance with motor energization.

Other objects and advantages of the invention will become apparent during the course of the following description.

In the drawing I have shown one embodiment of the invention. In this showing

FIGURE 1 is an axial sectional view through the motor mechanism showing portions of the pedal operable rod and the master cylinder, and FIGURE 2 is an enlarged fragmentary sectional view through a portion of the axially movable structure.

Referring to FIGURE 1 the numeral 10 indicates the fluid pressure motor as a whole comprising a cylinder 11 having a head 12 at one end to which is secured as at 13 a conventional master cylinder 14. A plunger 15 is operable in the master cylinder to develop in the pressure chamber 16 ahead of the plunger 15 braking pressures which are delivered to the vehicle wheel cylinder by the usual means (not shown) employed for this purpose. The master cylinder is provided with the usual reservoir 17 from which fluid is fed into the master cylinder through conventional ports 18 and 19.

The motor is provided with a pressure responsive unit 24 shown in the form of a diaphragm piston, as described below, comprising a body 25 having axially tubular extension 26 in abutting relationship with the master cylinder plunger 15. The body 25 is provided with a cylindrical flange 27 over which extends a rolling diaphragm 28 having an outer peripheral bead 29 fixed in position in a manner to be described with respect to a flange 30 carried by a cylinder 11. The inner periphery of the diaphragm 28 is provided with a bead 32 retained in position by a clamping plate 33 which also serves to fix in position a resilient bumper 34 for a purpose to be described.

A partition wall 38 has its outer periphery seating against the flange 30 and retains the bead 29 in position. The wall 38 is shaped as shown in FIGURE 1, having an offset portion 39 into which extends the adjacent portion of the body 25. From such offset portion, the wall 38 extends to the left or forwardly as at 40 and houses a seal 41 for a purpose to be described.

A cylinder 45 is arranged rearwardly of the cylinder 11 and may be formed as a deep drawn stamping having a mounting pad or flange 46 welded at its rear portion and provided with bolts 47 by means of which the entire unit may be fixed with respect to the fire wall of the motor vehicle. The forward end of the cylinder 45 is enlarged as at 48 to provide space for the adjacent portion of the wall 38 and an air supply nipple 49 may be fixed in any suitable manner, as by welding, to the cylinder 45 to connect a chamber 50 therein with a source of fluid pressure supply 51 through a conduit 52.

Within the cylinder 45 is arranged an axially movable structure 55 having a forwardly projecting portion 56 the outer surface of which is cylindrical and is axially slidable in the seal 41. At its rear or right-hand end, the axially movable structure 55 is enlarged circularly as at 57 and is provided with a seal 58 to form a fluid type connection between the structure 55 and the inner surface of the cylinder 45. A cap member 59, further described below, is fixed to the structure 55 by screws 60 and has its outer periphery cooperating with the structure 55 to form a channel in which the seal 58 is arranged.

Within the enlargement 57 of the structure 55 is formed a chamber 65 communicating through a passage 66 with the pressure chamber 67 of the motor, formed between the pressure responsive unit 24 and wall 39. The forward end of the cylindrical portion 56 of the structure 55 is formed as a sleeve-like extension normally engaging the bumper 34 and notched as at 67 to maintain communication between the passage 66 and chamber 67 when the parts are in the normal positions shown. Operation of the valve mechanism to be described supplies fluid pressure to the motor chamber 67 to operate the pressure responsive unit 24 to move it to the left against the tension of a return spring 68 arranged in the motor chamber 69, which is always at atmospheric pressure through a port 70 in the head 12. A stroke indicating rod 71 is fixed at one end to the body 25 and projects through the opening 70 to visually indicate the length of the stroke of the piston 24. The engagement of the bumper 34 with the structure 55 limits the movement of the motor piston 24 to off position.

A two-part valve body 75 is slidable in the structure 55 and is provided with two annular valves, namely, a pressure inlet valve 76 and an atmospheric valve 77. The valve 76 normally engages a seat 78 formed in the structure 55 and the space surrounding the valve 76 is open through a port 79 to the chamber 50 which, as stated, is always connected to the source of pressure. The left-hand end of the valve body 75 is slidable in an axial body 82 having an axial passage 83 therethrough communicating through the axial passage 84 of the valve body 75 with the chamber 65. The body 82 extends through a seal 85 carried by the piston body 25. This seal serves to prevent leakage between the motor chamber 67 and passage 66 and the space 86 within the axial extension 26 surrounding the adjacent end of the body 82. This space is open at all times to the atmospheric motor chamber 69 through a port 88. The enlarged right-hand end of the passage 83 contains a biasing spring 87 which tends to maintain the pressure valve 76 on its seat.

The cap 59 is provided with an axial extension 90 the outer surface of which is cylindrical and which surface is slidable in a seal 91 carried by the adjacent end of the cylinder 45. The extension 90 projects from the end of the cylinder 45 within a rubber boot 92 having one end connected to the cylinder 45 and its other end connected to a pedal operable rod 93. Such rod is connected by any suitable means 94 with an axially movable member 95, slidable in the extension 90.

A head 98 is fixed by a screw 99 to the member 95 and serves as a seat for the atmospheric valve 77, such valve being normally spaced from the head 98 so that atmospheric pressure is normally present in the chamber 65. The head 98 and member 95 are biased to their normal off positions by a spring 100, the member 95 engaging the extension 90 to limit its movement to off position.

A reaction diaphragm 104 has its outer periphery fixed between the enlargement 57 and cap 59 and has its inner periphery clamped between the head 98 and member 95. A ferrule 105 is urged to the left by a spring 106 to maintain the free portion of the diaphragm 104 normally in engagement with shoulder means 107 within and formed integral with the structure 55.

It will be apparent that the spring 68 serves to maintain the motor piston 24 in its normal position in engagement with the adjacent end of the structure 55. This spring also maintains the structure 55 in normal position, movement of the structure 55 being limited by a bumper 108 engaging the adjacent end of the cylinder 45. The spring 100 biases the head 98 away from the atmospheric valve 77 to maintain the normal communication between the chamber 65 and the atmosphere.

In accordance with the present invention, the space within the cylinder 45 to the right of the enlargement 57 forms a chamber 110. Pressure in this chamber is controlled in accordance with operation of the valve mechanism described above to maintain in the chamber 110 the same pressure as is being supplied to the motor. To this end, at least one of the bolts 60 (FIGURE 2) is provided with an axial passage 111 therethrough. One end of this passage communicates with the chamber 110 and the other end communicates through a passage 112 with the chamber 65. Therefore, whenever the valve mechanism is operated, as described below, to close the air valve 77 and open the pressure valve 76 to admit pressures to the chamber 65, such pressure will be duplicated in the chamber 110, and this feature forms an important feature of the invention. It is further pointed out and further described below that the diameter of the extension 90 is approximately equal to the diameter of that portion of the diaphragm 104 which is effective for transmitting reaction to the brake pedal. In this connection it is pointed out that the right-hand end of the extension 90 is exposed to the atmosphere through a small opening 115 in the boot 92, and atmospheric pressure is communicated through a passage 116 with the space 117 formed at the right-hand side of the diaphragm 104.

*Operation*

The parts of the mechanism normally occupy the positions shown in FIGURE 1. The chamber 50 is in fixed communication with the source of pressure and such pressure constitutes the only means for holding the structure 55 in normal position during operation of the mechanism under normal conditions, pressure in the chamber 50 acting toward the right side against the annular enlargement 57. The motor chamber 67 is in communication with the atmosphere through port 88, passages 83 and 84, through the space between the valve 77 and head 98 and passage 66. Accordingly atmospheric pressure will be present in the motor chamber 67 and also in the chamber 65. This atmospheric pressure will be communicated through port 112 (FIGURE 2) and passage 111 to the chamber 110. Thus it will be apparent that pressure of the source, always present in the chamber 50, acts to the right against the structure 55 to tend to maintain it in normal off position.

When the mechanism is to be operated, the brake pedal (not shown) is operated to move the push rod 93 and member 95 to the left in FIGURE 1 to first close the valve 77 and then effect movement of the valve body 75 to crack the valve 76. Closing of the valve 77 disconnects the chamber 65 from the atmospheric passage 84, and the cracking of the valve 76 admits pressure from the source into the chamber 65 thence through the passage 66 into the motor chamber 67. The piston 24 thus will move to the left and effect movement of the master cylinder plunger 15 to displace fluid from the chamber 16 into the wheel cylinders in accordance with conventional practice.

It is not necessary to move the pedal beyond the position at which the pressure valve 76 is cracked, thus only a very short pedal movement is necessary and this movement takes place initially solely against the loading of the spring 100. Up to the point at which the brake shoes engage the drums, the plunger 15 encounters little resistance and thus the motor chamber 67 is free to expand relatively rapidly without substantial pressure build-up therein. What pressure is built up in the chamber 67 is reflected in the chamber 65 and acts to the right against the head 98 to add to the loading of the spring 100 to transmit some reaction to the brake pedal so that the operator is apprised through the "feel" of the pedal that the motor 10 is being energized.

As soon as the brake shoes engage the drums, the master cylinder plunger 15 encounters substantial resistance. As a result, for a given opening of the valve 76, pressure in the chamber 67 builds up rapidly since the piston 24 moves only slightly. This rapid increase in pressure is duplicated in the chamber 65 and accordingly, substantially at the point of initial engagement of the brake shoes with the drums, the pressure in the chamber 65 overcomes the counter-reaction spring 106 to move the diaphragm 104 to the right in FIGURE 1. The ferrule 105 will be moved to its limit of movement in engagement with the adjacent shoulder of the member 95. The reaction against the brake pedal will now enter its second and relatively higher stage and will be the result of the sum of the pressures acting to the right against the diaphragm 104 and the left-hand face of the head 98 outwardly of the valve 77.

Continued increase in the energization of the motor progressively increases pedal reaction in the second stage referred to and the operator will "feel" a reaction force proportional to a degree of brake application. He also feels the deceleration of the vehicle and when proper braking has been attained, he will ease off very slightly on the brake pedal to seat the valve 76, under which conditions the valves 76 and 77 will be in lap positions, retaining the previously transmitted pressure in the chamber 67.

It is pointed out that full brake application is intended to be provided by the motor 10 without the assistance of foot pressure by the operator and this result is accomplished by the operation referred to above. Assuming that all of the desired braking has been effected and it is desired to release the pedal, the brake pedal will be released and all of the parts will return to their normal positions. The spring 100 will move the head 98 to the right releasing the valve body 75 so that the spring 87 closes the pressure valve 76. The valve 77 will be opened, thus again connecting the motor chamber to the atmosphere, whereupon the spring 68 returns the piston 24 to its normal position shown in FIGURE 1. The foregoing operations will have taken place without any axial movement of the structure 55.

It will be apparent that when the valve mechanism is operated to energize the motor, the pressure built up in the motor chamber 67 acts on the portions of the structure 55 facing to the left. This pressure, unopposed, would tend to add to the pressure in the chamber 50 tending to hold the structure 55 in its normal position. However, the various surfaces of the chamber 65, facing toward the right in FIGURE 1, will be subjected to a counteracting pressure acting toward the left. Also, pressure in the chamber 65 will be communicated through passages 112 and 111 to the chamber 110, and the surfaces of the cap 59 exposed to the chamber 110 will be exposed to the pressure of the motor to tend to counteract the source pressure in the chamber 50 and the motor pressures acting to the right against the surfaces of the structure 55 exposed to motor pressures. The surfaces exposed to pressures tending to move the structure 55 to the right are approximately equal to counteracting pressures acting on the surfaces referred to tending to move the structure 55 toward the left. Thus it will be apparent that if the motor 10 is energized to its maximum extent, that is, to the extent of "power run-out" previously referred to, pressures acting to the right and left against the various surfaces of the structure 55 will be balanced and there will be no biasing forces tending to hold the structure 55 in normal position. Beyond this point, the operator may easily depress the brake pedal to take up the play between the head 98 and the adjacent shoulder of the structure 55 so that this structure is free to move to the left under pedal pressures to assist the motor 10 in building up additional boosted pressure in the chamber 16. In other words, the structure 55 will now be pressure balanced, and this is a particularly important feature of the operation in the event the full intended pressure in the source is not available, because of fluid pressure line leakage or other malfunctioning of the means for supplying pressure to the chamber 50.

Whenever the pressures oppositely affecting the structure 55 are balanced, the resistance to foot pressure on the pedal is provided solely by the reaction means comprising the head 98 and diaphragm 104. As previously pointed out, the diameter of the extension 90 is equal to the diameter of a theoretical circle around the diaphragm 104 concentric with the axis of the mechanism. There will then be two equal and opposite forces affecting the member 95 and the elements connected thereto, namely, the reaction forces acting to the right and the pedal pressure acting to the left. This provides accurate "feel" in the brake pedal, there being no additional pedal resistance occurring through pressures affecting the structure 55. Thus the operator is forced to exert no more pressure against the pedal than is represented by the energization of the motor until the structure 55 has been moved to the left to engage the left-hand end thereof with the bumper 34, after which additional pressure of the pedal will assist the motor in operating the plunger 15 and the work thus performed by the operator will result in the transmission of direct supplemental reaction forces to the brake pedal.

As previously stated, the balancing of pressures acting in opposite directions relative to the structure 55 is particularly important where the full intended source pressure is not available. When such pressure is available under normal conditions, it is unnecessary for the operator to exert any force to assist the motor piston in performing its work. The present mechanism is particularly designed to operate with superatmospheric pressure, for example pressure of approximately 150 p.s.i. Such pressure is adequate for practically all braking operations. Assuming however that there is a leak in the line 52 or the pressure pump (not shown) is not functioning properly so that the pressure available and present in the chamber 50 is 75 p.s.i., insufficient pressure is available for a full braking operation. Under such conditions, an operation of the brake pedal will very rapidly result in the establishment of a pressure of 75 p.s.i. in the motor chamber 67. This pressure will be insufficient for full brake operation, but will balance pressures affecting the structure 55 whereupon the operator can push the brake pedal beyond its normal limit of travel to move the structure 55 to the left into engagement with the bumper 34 so that the operator may assist the motor 10 in applying the brakes.

From the foregoing it will be apparent that the present system provides a power operated mechanism for motor vehicle brakes wherein the operator normally moves the brake pedal only a very slight distance and with very little force to accomplish a full power application of the brakes. It also will be apparent that the structure 55 provides a mechanical connection between the brake pedal and the motor piston 24 whereby the operator, when the structure 55 is pressure balanced, can assist the motor 10 in applying the brakes. Under normal conditions, however, the structure 55 does not move and is maintained in its normal position by differential pressure which is present under most brake operating conditions.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A fluid pressure motor mechanism comprising a motor having a pressure responsive unit provided at one side with a pressure chamber, a structure engaging said pressure responsive unit and mounted for movement coaxially therewith, a source of pressure, a valve mechanism operable for connecting said pressure chamber to said source to move said pressure responsive unit, means for utilizing pressure in said source as a force tending to hold said structure in a normal off position, said valve mechanism including a manually operable member movable into engagement with said structure to tend to move it axially, and means for progressively reducing said force as pressure in said pressure chamber is built up by said valve mechanism whereby, when substantially maximum pressure is built up in said pressure chamber, said structure is relatively freely axially movable by said manually operable member to assist said pressure responsive unit in performing its work.

2. A fluid pressure motor mechanism comprising a motor having a pressure responsive member and provided with a wall forming with said pressure responsive member a pressure chamber, a structure mounted for sliding movement through said wall in sealing engagement therewith axially of said motor in abutting engagement with said pressure responsive unit, a source of pressure, a valve mechanism, having a manually operable member, operable for connecting said source to said pressure chamber through said structure to operate said pressure responsive unit, said manually operable member having limited movement relative to said structure to contact therewith after said valve mechanism has been operated, means utilizing pressure in said source for tending to hold such structure in normal operative position to prevent the movement of said structure by said manually operable member, and means for progressively reducing the effectiveness of pressure in said source for holding said structure against movement as pressure in said pressure chamber progressively increases whereby the net pressure force tending to hold said structure in said normal off position may be overcome upon engagement of said manually operable member with said structure whereby the latter may be moved in engagement with said pressure responsive unit to add to the force imparted to said unit by pressure in said pressure chamber.

3. A fluid pressure motor mechanism comprising a motor having a pressure responsive member and provided with a wall forming with said pressure responsive member a pressure chamber, a structure mounted for sliding movement through said wall in sealing engagement therewith axially of said motor in abutting engagement with said pressure responsive unit, a source of pressure, a valve mechanism, having a manually operable member, operable for connecting said source to said pressure chamber through said structure to operate said pressure responsive unit, said manually operable member having limited movement relative to said structure to contact therewith after said valve mechanism has been operated, a housing of which said wall forms one end, said structure, remote from said wall, having an enlargement in sliding sealing engagement with said housing, said structure, said wall and said housing defining a chamber communicating with said source whereby pressure in such chamber, acting against said enlargement, provides a biasing force tending to maintain said structure in a normal off position, and means for progressively reducing the effectiveness of said biasing force for holding said structure against movement as pressure in said pressure chamber progressively increases whereby any net biasing force tending to hold said structure in said normal off position may be overcome upon engagement of said manually operable member with said structure so the latter may be moved by said manually operable member in engagement with said pressure responsive unit to add to the force imparted to said pressure responsive unit by pressure in said pressure chamber.

4. A fluid pressure motor mechanism comprising a motor having a pressure responsive member and provided with a wall forming with said pressure responsive member a pressure chamber, a structure mounted for sliding movement through said wall in sealing engagement tnerewith axially of said motor in abutting engagement with said pressure responsive unit, a source of pressure, a valve mechanism, having a manually operable member, operable for connecting said source to said pressure chamber through said structure to operate said pressure responsive unit, said manually operable member having limited movement relative to said structure to contact therewith after said valve mechanism has been operated, a housing of which said wall forms one end, said structure, remote from said wall, having an enlargement in sliding sealing engagement with said housing, said structure, said wall and said housing defining a chamber communicating with said source whereby pressure in such chamber, acting against said enlargement, provides a biasing force tending to maintain said structure in a normal off position, said housing at the end thereof opposite said wall forming a counteracting pressure chamber to which said enlargement is exposed, and means for supplying to said counteracting pressure chamber pressures corresponding to pressures supplied to said pressure chamber whereby said biasing force is progressively reduced as pressure in said pressure chamber progressively increases so that operation of said manually operable member may move said structure in engagement with said pressure responsive unit to add to the force imparted to said unit by pressure in said pressure chamber.

5. A fluid pressure motor mechanism comprising a motor having a pressure responsive unit provided at one side with a pressure chamber, a source of pressure, a valve mechanism operable for connecting said pressure chamber to said source to move said pressure responsive unit, said valve mechanism comprising a manually operable member coaxial with said pressure responsive unit, a housing, and a structure within said housing having one end abutting said pressure responsive unit, said manually operable member having limited movement relative to the other end of said structure, said structure having an enlargement slidable in said housing and provided with a pair of chambers on opposite sides thereof, one of which chambers communicates with said source to act on said enlargement to tend to prevent movement of said structure from a normal off position, the other chamber of said pair being connected to said valve mechanism to be subjected thereby to the same pressure as said pressure chamber, said structure, when pressure in said other chambe equals pressure in said one chamber being substantially pressure balanced whereby movement of said manually operable member will move said structure relatively freely in engagement with said pressure responsive unit to transmit operating force thereto.

6. A fluid pressure motor mechanism comprising a motor having a pressure responsive unit provided at one side with a pressure chamber, a source of pressure, a valve mechanism operable for connecting said pressure chamber to said source to move said pressure responsive unit, said valve mechanism comprising a manually operable member coaxial with said pressure responsive unit, a housing, a structure within said housing having one end abutting said pressure responsive unit, said manually operable member having limited movement relative to the other end of said structure, said structure having an enlargement slidable in said housing and provided with a pair of chambers on opposite sides thereof, one of which chambers communicates with said source to act on said enlargement to tend to prevent movement of said structure from a normal off position, the other chamber of said pair being connected to said valve mechanism to be subjected thereby to the same pressure as said pressure chamber, said structure, when pressure in said other chamber equals pressure in said one chamber being substantially pressure balanced whereby movement of said manually operable member will move said structure relatively freely in engagement with said pressure responsive unit to transmit operating force thereto, and reaction means responsive to pressure supplied to said pressure chamber to oppose operation of said manually operable member to a degree proportional to pressure in said pressure chamber.

7. A fluid pressure motor mechanism comprising a motor having a pressure responsive unit provided at one side with a pressure chamber, a source of pressure, a valve mechanism, including a manually operable member, operable for connecting said pressure chamber to said source to move said pressure responsive unit, a structure comprising a mechanical connection between said manually operable member and said pressure responsive unit, said manually operable member having limited valve-operating movement relative to said structure, and a housing surrounding said structure and in which the latter is axially slidable, said structure having surface portions exposed to said pressure source to tend to move said structure away from said pressure responsive unit to maintain it in a normal off position, said structure having surface portions facing oppositely to said first named surface portions exposed to the same pressure as said pressure chamber whereby, when pressure in said pressure chamber equals pressure in said source, said structure will be pressure balanced so as to offer no opposition to movement thereof by said manually operable member whereby the latter will move said structure in engagement with said pressure responsive unit to transmit an operating force thereto.

8. A motor mechanism according to claim 7 provided with a pressure responsive element carried by said structure and engaging said manually operable member, said pressure responsive element being exposed to the same pressure as said pressure chamber to oppose valve operating movement of said manually operable member to a degree proportional to pressure in said pressure chamber.

9. A fluid pressure motor mechanism comprising a motor having a pressure responsive unit provided at one side with a pressure chamber, a structure engaging said pressure responsive unit and mounted for movement coaxially therewith, a source of pressure, a valve mechanism operable for connecting said pressure chamber to said source to move said pressure responsive unit, means for utilizing pressure in said source as a force tending to hold said structure in a normal off position, said valve mechanism including a manually operable member movable into engagement with said structure to tend to move it axially, means for progressively reducing said force as pressure in said pressure chamber is built up by said valve mechanism whereby, when substantially maximum pressure is built up in said pressure chamber, said structure is relatively freely axially movable by said manually operable member to assist said pressure responsive unit in performing its work, and a pressure responsive element carried by said structure and exposed to pressure in said pressure chamber, said pressure responsive element engaging said manually operable member to oppose movement thereof to a degree proportional to pressure in said pressure chamber.

10. A fluid pressure motor mechanism comprising a motor casing, a pressure responsive unit therein, a housing axially aligned with said casing, a wall dividing said housing and said casing and forming with said pressure responsive unit a pressure chamber, an axially movable structure in said housing in sealed sliding engagement therewith, said structure, said housing and said wall forming a second chamber, a source of pressure communicating with said second chamber, said structure having surface portions subject to pressure in said second chamber to maintain it in a normal off position, a valve mechanism carried by said structure and having a manually operable member mounted for limited movement relative to said structure to operate said valve mechanism, said structure projecting axially through said wall in sealing engagement therewith and normally abutting said pressure responsive unit, and means operative when pressure is supplied to said pressure chamber for progressively reducing the effectiveness of pressure in said second chamber for maintaining said structure in said normal off position whereby, when operation of said valve mechanism establishes in said pressure chamber a pressure substantially equal to pressure in said source, said structure becomes relatively freely movable by said manually operable member to transmit force from said manually operable member to said pressure responsive unit.

11. A fluid pressure motor mechanism comprising a motor having a pressure responsive unit provided at one side with a pressure chamber, a structure engaging said pressure responsive unit and mounted for movement coaxially therewith, a source of pressure, a valve mechanism operable for connecting said pressure chamber to said source to move said pressure responsive unit, means for utilizing pressure in said source as a force tending to hold said structure in a normal off position, said valve mechanism including a manually operable member having limited valve operating movement relative to said structure and movable into engagement with said structure to tend to move it axially, means for progressively reducing the effectiveness of said force as pressure in said pressure chamber is built up by said valve mechanism whereby, when substantially maximum pressure is built up in said pressure chamber, said structure is relatively freely axially movable by said manually operable member to assist said pressure responsive unit in performing its work, and a reaction diaphragm connected between said structure and said manually operable member and subject to the same pressure as said pressure chamber to react against said manually operable member to a degree proportional to pressure in said pressure chamber.

12. A fluid pressure motor mechanism comprising a motor casing, a pressure responsive unit therein, a housing axially aligned with said casing, a wall dividing said housing and said casing and forming with said pressure responsive unit a pressure chamber, an axially movable structure in said housing in sealed sliding engagement therewith, said structure, said housing and said wall forming a second chamber, a source of pressure communicating with said second chamber, said structure having surface portions subject to pressure in said second chamber to maintain it in a normal off position, a valve mechanism carried by said structure and having a manually operable member mounted for limited movement relative to said structure to operate said valve mechanism, said structure projecting axially through said wall in sealing engagement therewith and normally abutting said pressure responsive unit, said structure at the side opposite said second chamber forming with said housing a third chamber to which pressure is supplied upon operation of said valve mechanism to oppose pressure in said second chamber whereby the tendency of pressure in said second chamber to hold said structure in said normal off position is progressively reduced as pressure is supplied to said third chamber to render said manually operable member operative for engaging said structure to move the latter to transmit force to said pressure responsive unit.

13. A fluid pressure motor mechanism comprising a motor casing, a pressure responsive unit therein, a housing axially aligned with said casing, a wall dividing said housing and said casing and forming with said pressure responsive unit a pressure chamber, an axially movable structure in said housing in sealed sliding engagement therewith, said structure, said housing and said wall forming a second chamber, a source of pressure communicating with said second chamber, said structure having surface portions subject to pressure in said second chamber to maintain it in a normal off position, a valve mechanism carried by said structure and having a manually operable member mounted for limited movement relative to said structure to operate said valve mechanism, said structure projecting axially through said wall in sealing engagement therewith and normally abutting said pressure responsive unit, said structure having an axial portion at the end adjacent said pressure responsive unit of substantially smaller diameter than said housing, said wall having a seal through which said axial portion projects into engagement with said pressure responsive unit, said structure having an annular enlargement at one side of which said second chamber is formed and at the opposite side of which is formed a third chamber, said structure having an internal chamber communicating through said structure with said pressure chamber and to which pressure is supplied from said second chamber upon operation of said valve mechanism, said third chamber communicating with said internal chamber to be supplied with pressure therefrom corresponding to pressure supplied to said pressure chamber, said structure having oppositely facing surfaces, including opposite sides of said enlargement, subject respectively to the pressure in said source and the pressure supplied to said pressure chamber whereby when the latter pressure equals the pressure of said source said structure is pressure balanced and subject to relatively free movement by said manually operable member to transmit force to said pressure responsive unit.

14. A mechanism according to claim 13 wherein said manually operable member is provided with a pressure surface exposed to pressure in said internal chamber to oppose movement of said manually operable member, and an annular diaphragm connected at its outer periphery to said structure and at its inner periphery to said manually operable member and having one side exposed to pressure in said internal chamber to further oppose valve operating movement of said manually operable member.

No references cited.